(12) United States Patent
Takahashi

(10) Patent No.: US 6,594,037 B1
(45) Date of Patent: Jul. 15, 2003

(54) IMAGE READING APPARATUS

(75) Inventor: Toshio Takahashi, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/422,454

(22) Filed: Oct. 21, 1999

(30) Foreign Application Priority Data

Oct. 29, 1998 (JP) .......................................... 10-308718

(51) Int. Cl.[7] .............................................. H04M 1/04
(52) U.S. Cl. ...................................... 358/474; 358/473
(58) Field of Search ........................... 358/474, 1.12, 358/506, 497, 471, 473; 250/208.1

(56) References Cited

U.S. PATENT DOCUMENTS 5,764,382 A * 6/1998 Shiraishi ..................... 358/496
6,147,339 A * 11/2000 Matsumoto .............. 250/208.1
6,389,183 B1 * 5/2002 Han ........................... 382/313

FOREIGN PATENT DOCUMENTS

JP          02036665       *    7/1998    .......... H04N/1/028

* cited by examiner

Primary Examiner—Jerome Grant, II
Assistant Examiner—Negussie Worku
(74) Attorney, Agent, or Firm—Morgan & Finnegan, LLP

(57) ABSTRACT

In an image reading apparatus such as copying apparatus, image scanner, or the like using a contact type image sensor, a frame of the contact type image sensor is made of a resin material and a cross sectional shape of an original plate glass in the sensor longitudinal direction of the contact type sensor is formed in almost the same curve shape as a warp shape in the vertical direction of an original of the contact type image sensor, thereby constructing such that the distance is substantially equal at all positions and solving a problem that an out-of-focus partially occurs.

12 Claims, 5 Drawing Sheets

SCANNING DIRECTION $L_1 \fallingdotseq L_2$

WARP

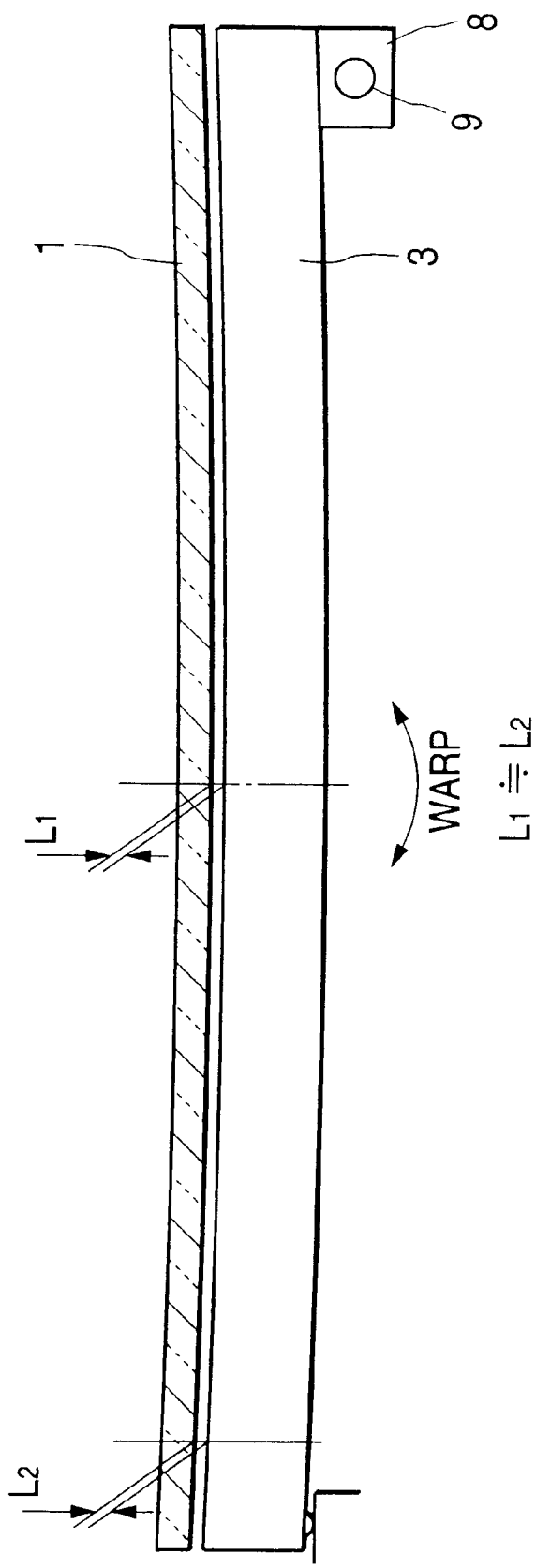

IMAGE READING APPARATUS

BACKGROUND OF THE INVENTION

1. Field of the Invention

The invention relates to an image reading apparatus such as copying apparatus, image scanner, or the like using a contact type image sensor.

2. Related Background Art

FIG. 4A shows an image scanner as an example of an image reading apparatus. FIG. 4B is a cross sectional view of a main portion of the image scanner. In FIG. 4A or 4B, reference numeral 1 denotes an original plate glass; 2 a pressing plate to press an original 20 put on the original plate glass 1; 3 a contact type image sensor; 4 a frame of the image sensor 3; 5 a lens array; 6 a sensor; 7 a light guide; 8 a sensor holder; 9 a guide shaft; 10 a wire winding barrel (drum); 11 a wire for driving the image sensor; and 12 a driving motor.

Generally, an LED is used as a light source (not shown). The LED is arranged in an edge portion of the light guide 7. The light beam emitted from the LED is converted into a linear light beam by the light guide 7 to irradiate the surface of the original. An image of the original 20 on the original plate glass 1 is formed onto the surface of the sensor 6 by the lens array 5 and photoelectrically converted by the sensor 6. By forming the above construction as one unit, the contact type image sensor 3 is formed.

The contact type image sensor 3 is held by the sensor holder 8 which is a holding member and linearly moves in the direction (scanning direction shown by an arrow) perpendicular to the longitudinal direction of the contact type image sensor 3 along the guide shaft 9 while keeping a distance from the original plate glass 1, thereby scanning the plane-shaped original.

Generally, the frame 4 of the contact type image sensor 3 is made of a resin. The contact type image sensor 3 is formed by fixing various component parts such as light guide 7, lens array 5, sensor board, and the like onto the frame 4. The frame 4 of the contact type image sensor 3 generally has a rod shape in terms of a construction of each of the above parts. Therefore, when it is formed, a tendency of "warp" is likely to occur. FIG. 5 shows an enlarged diagram of the main portion of such a state.

When the frame 4 has such a warp tendency, a board of the lens array 5 and sensor 6 fixed onto the frame 4 is also deformed in a frame shape. The original plate glass 1 is usually formed by cutting a plate glass called a "float glass" into a desired shape and used. The glass ordinarily has precision that is extremely close to that of a flat surface, so that a radius of curvature of the glass is equal to 100 to 500 mR.

In this case, as shown in FIG. 5, a distance between the original plate glass 1 and contact type image sensor 3 differs depending on the location in the longitudinal direction of the contact type image sensor 3. Therefore, although an object surface focal position of the lens array 5 and the upper surface of the original plate glass 1 coincide in the edge portion of the contact type image sensor 3, the object surface focal position of the lens array 5 is further deviated to the upper side than the upper surface of the original plate glass 1 in the center portion of the contact type image sensor 3 due to an influence by a warp of the sensor.

It is now assumed that a distance from the top edge surface of the lens array 5 to the object surface side focal position is set to d, a distance from the top edge surface of the lens array 5 to the upper surface of the original plate glass 1 is set to d', and a depth of field of the lens is set to D. In this case, the following relational expression has to be satisfied to avoid the occurrence of an out-of-focus of the original image to be read.

$$d-D/2 \leq d' \leq d+D/2$$

If distance d' from the top edge surface of the lens array 5 to the upper surface of the original plate glass 1 lies within the range obtained by the above expression, since the upper surface of the original plate glass 1 is located in the depth of focus of the lens array 5, an out-of-focus does not occur. However, if a value of d' exceeds the range obtained by the above expression and is shorter than (d−D/2) or longer than (d+D/2), there is a problem such that an out-of-focus occurs. Particularly, in recent years, a conjugate length of the lens array which is used in the contact type image sensor becomes short in accordance with a demand for miniaturization of the apparatus, so that the depth of field is shallow. Consequently, the problem of the out-of-focus is likely to occur.

Generally, a size of gap between the original plate glass 1 and contact type image sensor 3 is very small and there is also a problem such that if a warp amount of the contact type image sensor 3 is large, the lens array 5 or frame 4 is come into contact with the back surface of the original plate glass 1 and an abnormal sound is generated.

FIG. 6 is a schematic diagram of a frame die to form the frame 4 of the contact type image sensor. The direction of the warp of the sensor frame 4 can be controlled by a frame shape or a gate position or by providing a temperature difference between a cabinet side 16 of the frame die to form the frame and a core side 15, or the like. For example, if a temperature of the die on the cabinet side is set to be higher than that on the core side, a contraction on the core side of a low frame temperature is large, so that the frame can be controlled to a shape that is warped upward. It is, however, substantially difficult to suppress a warp amount to zero.

As means for correcting the warp of the sensor frame 4, there is a method of fixing the contact type image sensor 3 to a member such as an iron plate or the like and keeping the flatness by using the flatness and rigidity of the iron plate. There is, however, a problem such that an excessive force is applied to the contact type image sensor 3, longevity and optical characteristics are influenced, and the like. Since the member such as an iron plate is used, there is also a problem of costs such that the number of parts increases.

SUMMARY OF THE INVENTION

In an image reading apparatus using a contact type image sensor, it is an object of the invention to prevent a deterioration of a picture quality such as out-of-focus or the like due to a warp of the contact type image sensor and a contact between the contact type image sensor and an original plate glass.

According to one aspect of the invention, there is provided an image reading apparatus comprising: an original plate glass to put an original; a contact type image sensor to read image information of the original; and moving means for moving the contact type image sensor relatively to the original, wherein a warp shape of the original plate glass in the longitudinal direction of the contact type image sensor and a warp shape of the contact type image sensor are almost the same.

By constructing as mentioned above, the deterioration in picture quality such as out-of-focus or the like and the contact between the contact type image sensor and the original plate glass can be prevented.

BRIEF DESCRIPTION OF THE DRAWINGS

FIG. 2 is a cross sectional front view of a main portion of an image reading apparatus in an embodiment of the invention;

DETAILED DESCRIPTION OF THE PREFERRED EMBODIMENTS

An embodiment of the invention will now be described in detail hereinbelow with reference to the drawings.

Figure 1A:
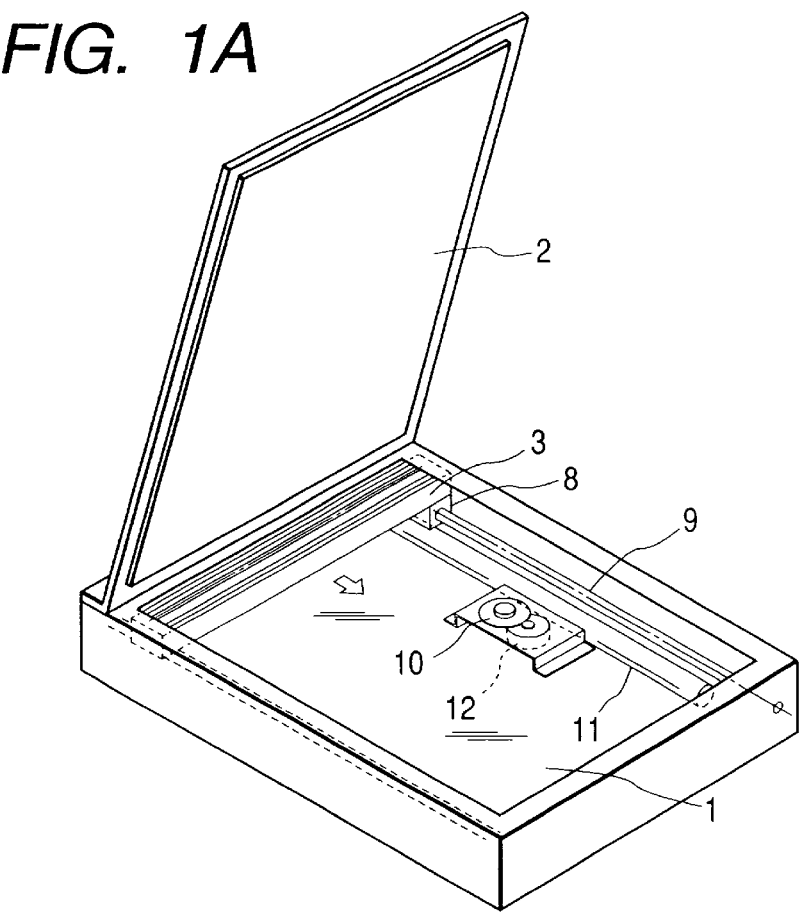
FIG. 1A is a schematic constructional diagram of an image reading apparatus of an embodiment of the invention.
Figure 1B:
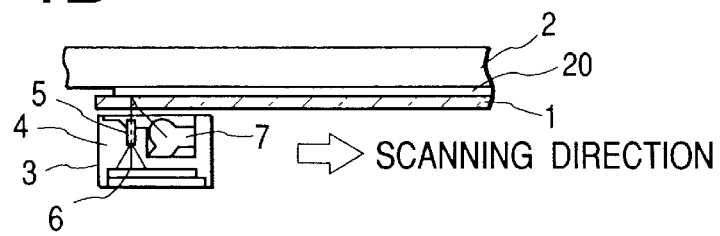
FIG. 1B is a cross sectional view of a main portion in a state where a pressing plate of the image reading apparatus is closed in the embodiment of the invention.
Figure 1C:
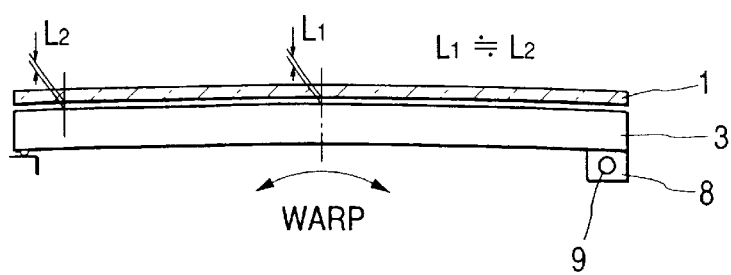
FIG. 1C is a cross sectional front view of the main portion of the image reading apparatus in the embodiment of the invention.
Figure 4A:
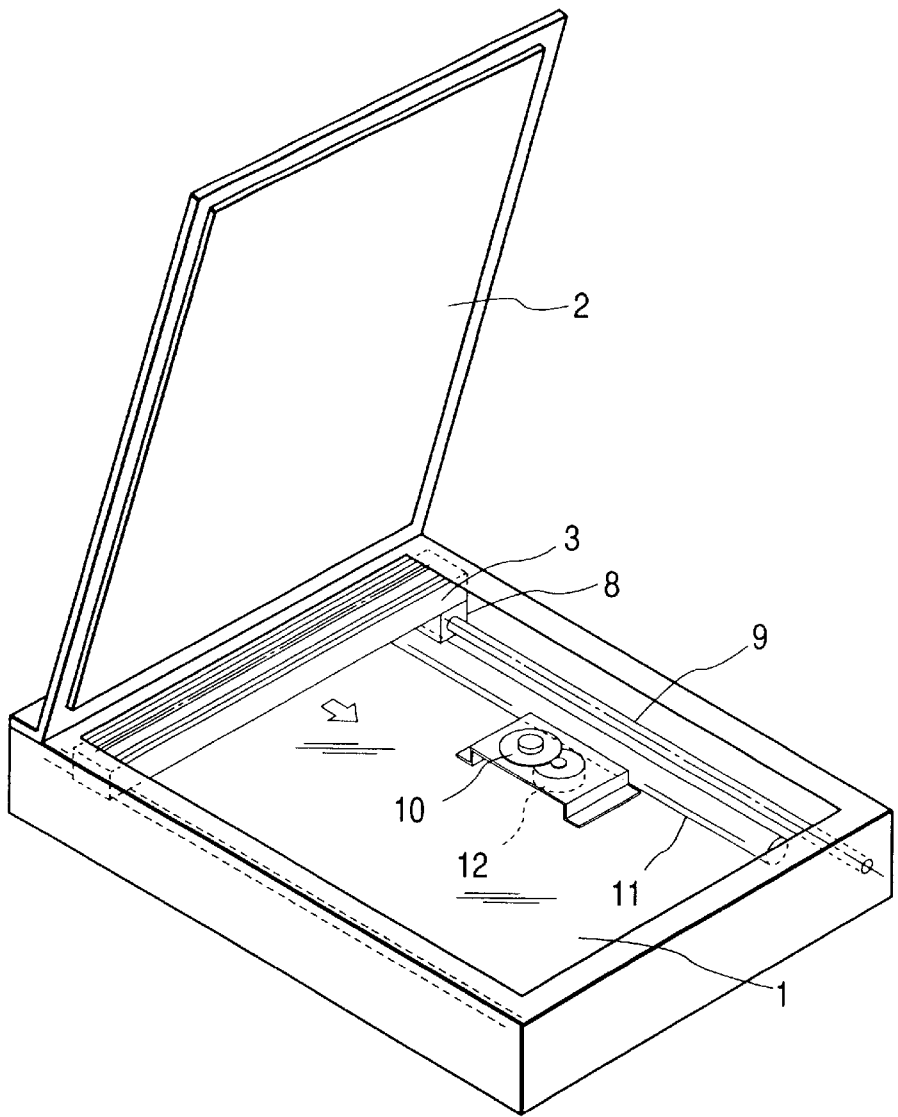
FIG. 4A is a schematic constructional diagram of a conventional image reading apparatus.
Figure 4B:
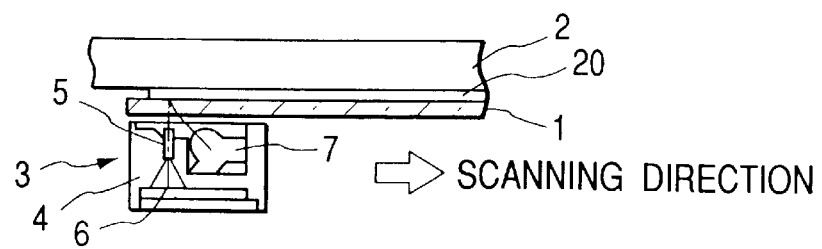
FIG. 4B is a cross sectional view of a main portion in a state where a pressing plate of the conventional image reading apparatus is closed.
Figure 5:
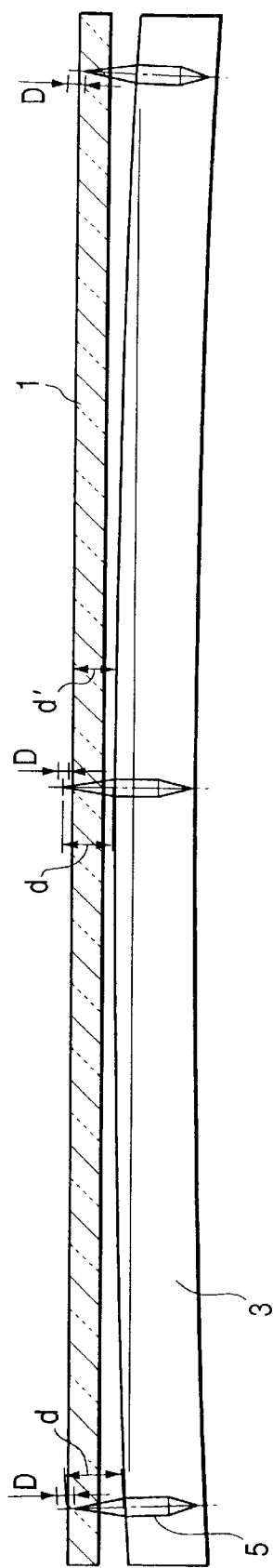
FIG. 5 is a cross sectional front view of a main portion of the conventional image reading apparatus.
Figure 6:
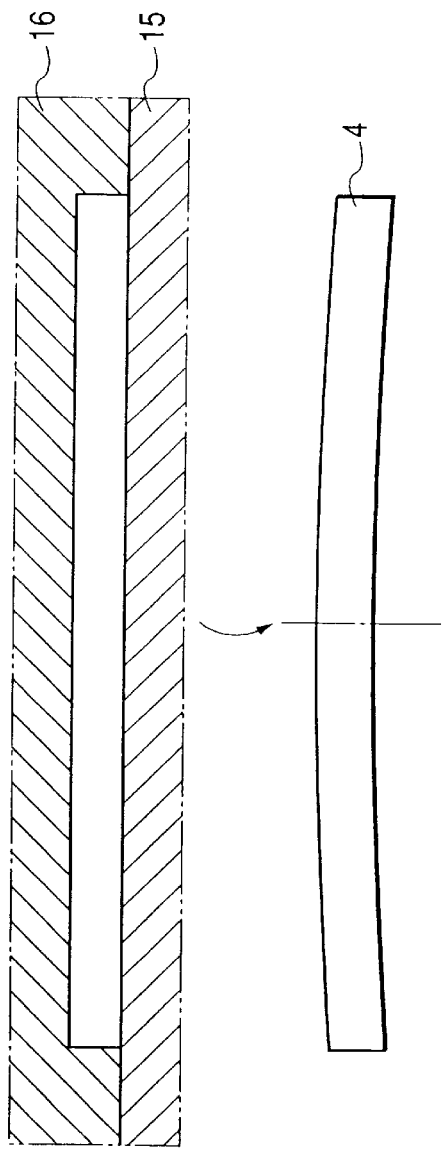
FIG. 6 is a schematic diagram of a frame die to form a frame 4 of a contact type image sensor.

FIG. 1A shows a schematic diagram of an image reading apparatus of the first embodiment of the invention. FIG. 1B shows a cross sectional side elevational view of a main portion in a state where a pressing plate is closed. FIG. 1C is a cross sectional front view of the main portion in FIG. 1A. The same (corresponding) component elements as those in FIGS. 4A and 4B are designated by the same reference numerals.

In the diagram, reference numeral 1 denotes the original plate glass; 2 the pressing plate to press the original 20 put on the original plate glass 1; 3 the contact type image sensor; 4 the frame for the image sensor 3; 5 the lens array; 6 the sensor; 7 the light guide; 8 the sensor holder; 9 the guide shaft; 10 the wire winding barrel (drum); 11 the wire for driving the image sensor; and 12 the driving motor.

The original plate glass 1 having a thickness of about 3 mm is arranged on the original surface. The contact type image sensor 3 is held in the sensor holder 8. An engaging hole adapted to be come into engagement with the guide shaft 9 is formed in the sensor holder 8. The guide shaft 9 is penetrated through the engaging hole and the sensor holder 8 is slidably moved on the guide shaft 9 by the towing wire 11, so that the contact type image sensor 3 is linearly moved in the scanning direction.

In case of the embodiment, the contact type image sensor 3 has a warp which is upward in the longitudinal direction of the sensor 3 for the original surface as shown in FIG. 1C.

A cross sectional shape of the original plate glass 1 in the longitudinal direction of the contact type image sensor 3 is almost the same as the warp shape of the contact type image sensor 3, thereby constructing such that the distance between the contact type image sensor 3 and original plate glass 1 is substantially equal at all positions.

The partial out-of-focus can be certainly prevented even in case of using a lens array of a shallow depth of focus such that a conjugate length is equal to 10 mm or less and a depth of field is equal to 0.5 mm or less.

On the other hand, the image sensor 3 does not have a curvature in the direction (scanning direction shown by an arrow) of the original plate glass 1 that is perpendicular to the longitudinal direction of the contact type image sensor 3 and is parallel with the guide shaft 9.

The original 20 is come into close contact with the glass surface of the original plate glass 1 by a pressing force of the original pressing plate 2. Thus, the distance between the original and the contact type image sensor 3 can be equalized in the whole scanning range, so that an out-of-focus due to the warp of the contact type image sensor 3 can be prevented.

Although there is a method of bending the original plate glass 1 while applying a heat to a die in order to change the shape of the original plate glass, since a (heat reinforcing) step of performing an "annealing process" is ordinarily performed in order to increase a strength of the glass, if the shape is changed in this step, an increase in costs is very small.

FIG. 2 shows a cross sectional front view of a main portion of the second embodiment in which the contact type image sensor 3 has a downward warp opposite to the case shown in FIG. 1C. In this case, the cross sectional shape of the original plate glass 1 in the longitudinal direction of the contact type image sensor 3 is obviously constructed so as to be almost identical to the downward warp shape contrarily to the case where it has the upward warp. Therefore, an overlapped description is omitted here.

Figure 3A:
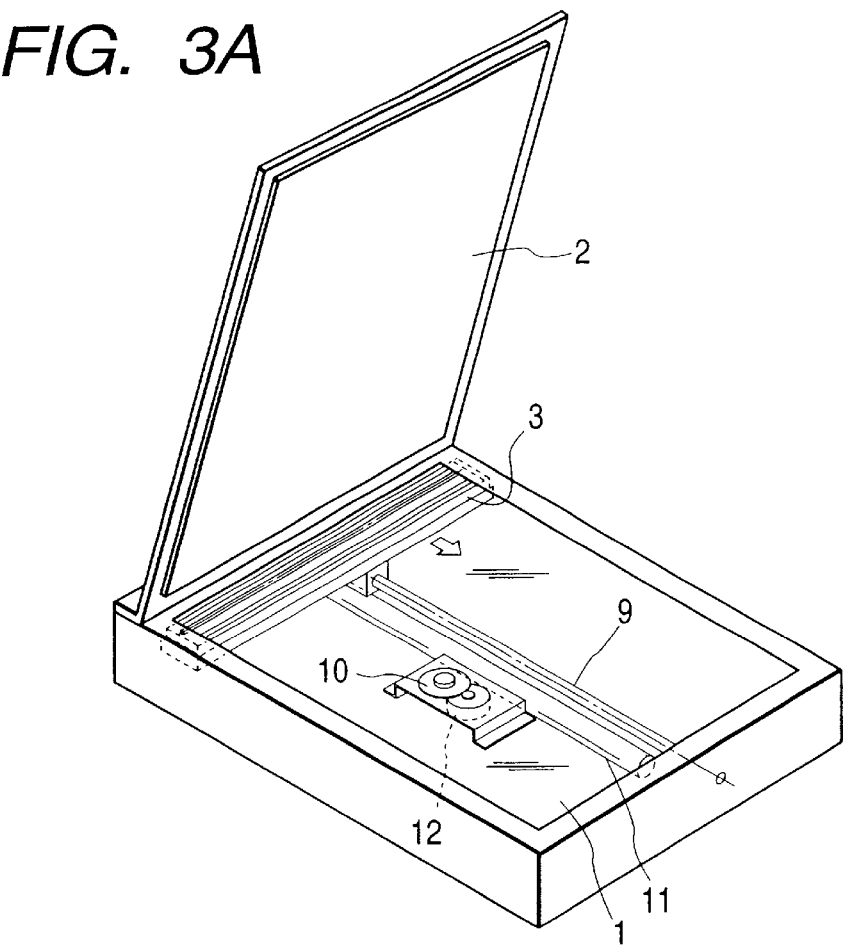
FIG. 3A is a schematic constructional diagram of an image reading apparatus of an embodiment of the invention.
Figure 3B:
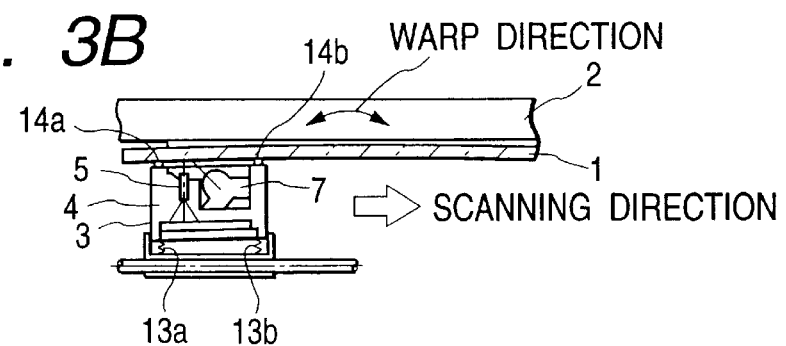
FIG. 3B is a cross sectional view of a main portion in a state where a pressing plate of the image reading apparatus is closed in the embodiment of the invention.
Figure 3C:
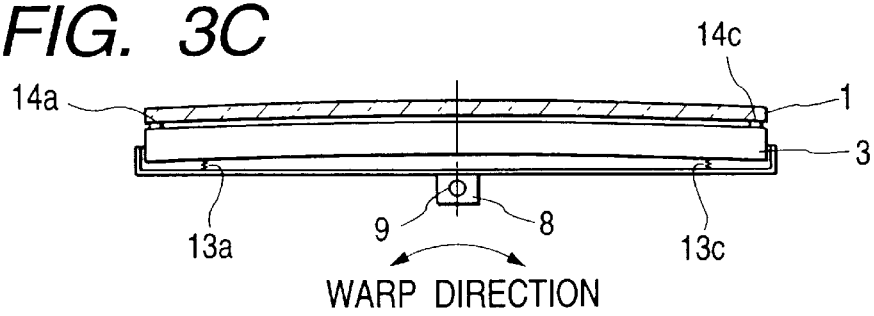
FIG. 3C is a cross sectional front view of a main portion of an image reading apparatus in an embodiment of the invention.

FIG. 3A shows a schematic constructional view of an image reading apparatus of the third embodiment of the invention. FIG. 3B is a side elevational view of a main portion in a state where a pressing plate is closed. FIG. 3C is a cross sectional front view of the main portion. In the embodiment, a case where the contact type image sensor 3 has an upward warp is shown.

That is, spacers 14a, 14b, and 14c to keep the distance between the original plate glass 1 and contact type image sensor 3 are arranged on the top portion of the contact type image sensor 3. The contact type image sensor 3 is urged in the direction of the original plate glass 1 by springs 13a, 13b, and 13c. Each of the spacers 14a, 14b, and 14c is made of a plastic material having high slidability, thereby extremely reducing a friction with the original plate glass 1.

When the original plate glass 1 is thermally deformed, there is a case where a distortion occurs at an unexpected position in dependence on conditions. For example, there is a case where a distortion (deformation) due to a thermal deformation occurs in the original plate glass 1 in the direction (scanning direction shown by an arrow) perpendicular to the longitudinal direction of the contact type image sensor 3. Even in this case, however, since the distance between the original plate glass 1 and contact type image sensor 3 is always held constant by the spacers 14a, 14b, and 14c, the image deterioration such as out-of-focus can be prevented. There is also an effect that a manufacturing yield of the original plate glass 1 is improved and the costs are reduced.

According to the third embodiment, the original plate glass 1 can be purposely formed in a three-dimensional curve. For example, by forming the original plate glass surface in an almost spherical shape, the strength of the original plate glass 1 can be increased.

As described above, by allowing the shape of the original plate glass to be adapted to the warp shape of the contact type image sensor, the distance between the contact type image sensor and the original plate glass can be substantially made constant at all positions. The image deterioration due to the out-of-focus, the generation of an abnormal sound due to the contact between the contact type image sensor and the original plate glass, and the like can be prevented.

By holding the distance between the original plate glass and the contact type image sensor by the spacer means, even if there is a distortion (deformation) due to a thermal deformation in the original plate glass in the direction (scanning direction) perpendicular to the longitudinal direction of the contact type image sensor, a fluctuation of the distance between the contact type image sensor and the original plate glass is suppressed, and the image deterioration due to the out-of-focus can be prevented.

Furthermore, the original plate glass can be purposely formed in, for example, a three-dimensional curved shape such as an almost spherical surface and an effect that the strength of the original plate glass is increased can be expected.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:

an original plate glass for supporting an original;

a contact type image sensor for reading image information of said original; and a moving unit adapted to move said contact type image sensor relative to said original, wherein a warp shape of said original plate glass in the longitudinal direction of said contact type image sensor and a warp shape of said contact type image sensor are almost the same.

2. An apparatus according to claim 1, further comprising a spacer member arranged between said original plate glass and said contact type image sensor.

3. An apparatus according to claim 2, further comprising a spring adapted to urge said contact type image sensor towards said original plate glass.

4. An apparatus according to claim 1, wherein said contact type image sensor has a lens array, a light guide light source, and a frame to hold said lens array and said light guide light source, and the warp shape of said original plate glass and a warp shape of said frame are almost the same.

5. An apparatus according to claim 4, further comprising a guide shaft to guide when said contact type image sensor is moved by said moving unit.

6. An apparatus according to claim 4, wherein said moving unit includes a wire.

7. An apparatus according to claim 4, further comprising a spacer member arranged between said original plate glass and said contact type image sensor.

8. An apparatus according to claim 4, wherein said moving unit includes a motor.

9. An apparatus according to claim 1, further comprising a guide shaft to guide when said contact type image sensor is moved by said moving unit.

10. An apparatus according to claim 1, wherein said moving unit includes a wire.

11. An apparatus according to claim 1, wherein said moving unit includes a motor.

12. An apparatus according to claim 1, further comprising a spring adapted to urge said contact type image sensor towards said original plate glass.

\* \* \* \* \*